US011012386B2

(12) United States Patent
Lee

(10) Patent No.: US 11,012,386 B2
(45) Date of Patent: May 18, 2021

(54) NON-TRANSITORY COMPUTER-READABLE RECORDING MEDIUM, METHOD, SYSTEM, AND APPARATUS FOR EXCHANGING MESSAGE

(71) Applicant: LINE Corporation, Tokyo (JP)

(72) Inventor: Il Gu Lee, Tokyo (JP)

(73) Assignee: LINE CORPORATION, Tokyo (JP)

( * ) Notice: Subject to any disclaimer, the term of this patent is extended or adjusted under 35 U.S.C. 154(b) by 128 days.

(21) Appl. No.: 15/384,667

(22) Filed: Dec. 20, 2016

(65) Prior Publication Data
US 2017/0187654 A1    Jun. 29, 2017

(30) Foreign Application Priority Data

Dec. 29, 2015    (KR) .......................... 10-2015-0189020

(51) Int. Cl.
*H04L 12/58* (2006.01)
*G06F 40/274* (2020.01)
*G06F 40/279* (2020.01)

(52) U.S. Cl.
CPC .......... *H04L 51/046* (2013.01); *G06F 40/274* (2020.01); *G06F 40/279* (2020.01); *H04L 51/14* (2013.01); *H04L 51/16* (2013.01)

(58) Field of Classification Search
CPC ....... H04L 51/04; H04L 51/046; H04L 51/14; H04L 51/16; G06F 17/276; G06F 17/2765
See application file for complete search history.

(56) References Cited

U.S. PATENT DOCUMENTS

| 9,042,923 | B1* | 5/2015 | Mirho | H04W 4/14 455/466 |
| 2006/0029106 | A1* | 2/2006 | Ott | H04L 67/306 370/522 |
| 2008/0189367 | A1 | 8/2008 | Okumura | |
| 2012/0330993 | A1* | 12/2012 | Faiman | G06Q 10/107 707/769 |

(Continued)

FOREIGN PATENT DOCUMENTS

JP    2008191748 A    8/2008
JP    2009258970 A    11/2009

(Continued)

OTHER PUBLICATIONS

Korean Office Action dated Jul. 11, 2016 for corresponding Korean Patent Application No. 10-2015-0189020.

(Continued)

*Primary Examiner* — Dhairya A Patel
*Assistant Examiner* — Sujana Khakural
(74) *Attorney, Agent, or Firm* — Harness, Dickey & Pierce, P.L.C.

(57) ABSTRACT

Provided is a computer program stored in a non-transitory computer-readable recording medium to execute, by using a computer, a message exchanging method including: receiving, from a user, at least some of a message to be transmitted; extracting at least one keyword from the message to be transmitted, and extracting at least one interlocutor related to the at least one keyword; converting the at least some of the message to at least one recommended message according to the at least one interlocutor; and transmitting the at least one recommended message to each of the at least one interlocutor.

16 Claims, 12 Drawing Sheets

(56) References Cited

U.S. PATENT DOCUMENTS

| | | | | |
|---|---|---|---|---|
| 2013/0198297 A1* | 8/2013 | Saabas | ............... | G06Q 10/1095 709/206 |
| 2014/0111689 A1 | 4/2014 | Kim et al. | | |
| 2014/0164508 A1* | 6/2014 | Lynch | .................... | H04L 67/00 709/204 |
| 2015/0088998 A1* | 3/2015 | Isensee | ................ | G06F 40/279 709/206 |
| 2015/0302301 A1* | 10/2015 | Petersen | .............. | G06Q 10/107 706/11 |
| 2015/0304254 A1* | 10/2015 | Arai | ........................ | H04L 51/04 709/206 |
| 2015/0350118 A1* | 12/2015 | Yang | .................... | G06F 40/274 715/752 |
| 2016/0043975 A1 | 2/2016 | Park et al. | | |
| 2016/0301639 A1* | 10/2016 | Liu | ........................ | H04L 51/32 |
| 2016/0352895 A1* | 12/2016 | Son | ....................... | G10L 13/033 |
| 2016/0357761 A1* | 12/2016 | Siracusa | ............. | G06F 16/3322 |
| 2017/0161245 A1* | 6/2017 | Han | ....................... | G06F 40/166 |
| 2018/0241701 A1* | 8/2018 | Miyajima | .............. | G06Q 50/10 |

FOREIGN PATENT DOCUMENTS

| | | | | |
|---|---|---|---|---|
| JP | 2014086088 A | | 5/2014 | |
| KR | 2013/0061387 A | | 6/2013 | |
| KR | 2014/0047491 A | | 4/2014 | |
| KR | 2014/0132881 A | | 11/2014 | |
| KR | 20160141595 A | * | 6/2015 | |
| KR | 20160141595 A | * | 12/2016 | ........... G06F 17/289 |

OTHER PUBLICATIONS

Japanese Office Action dated Oct. 6, 2020 for corresponding Japanese Patent Application No. 2016-242061.

* cited by examiner

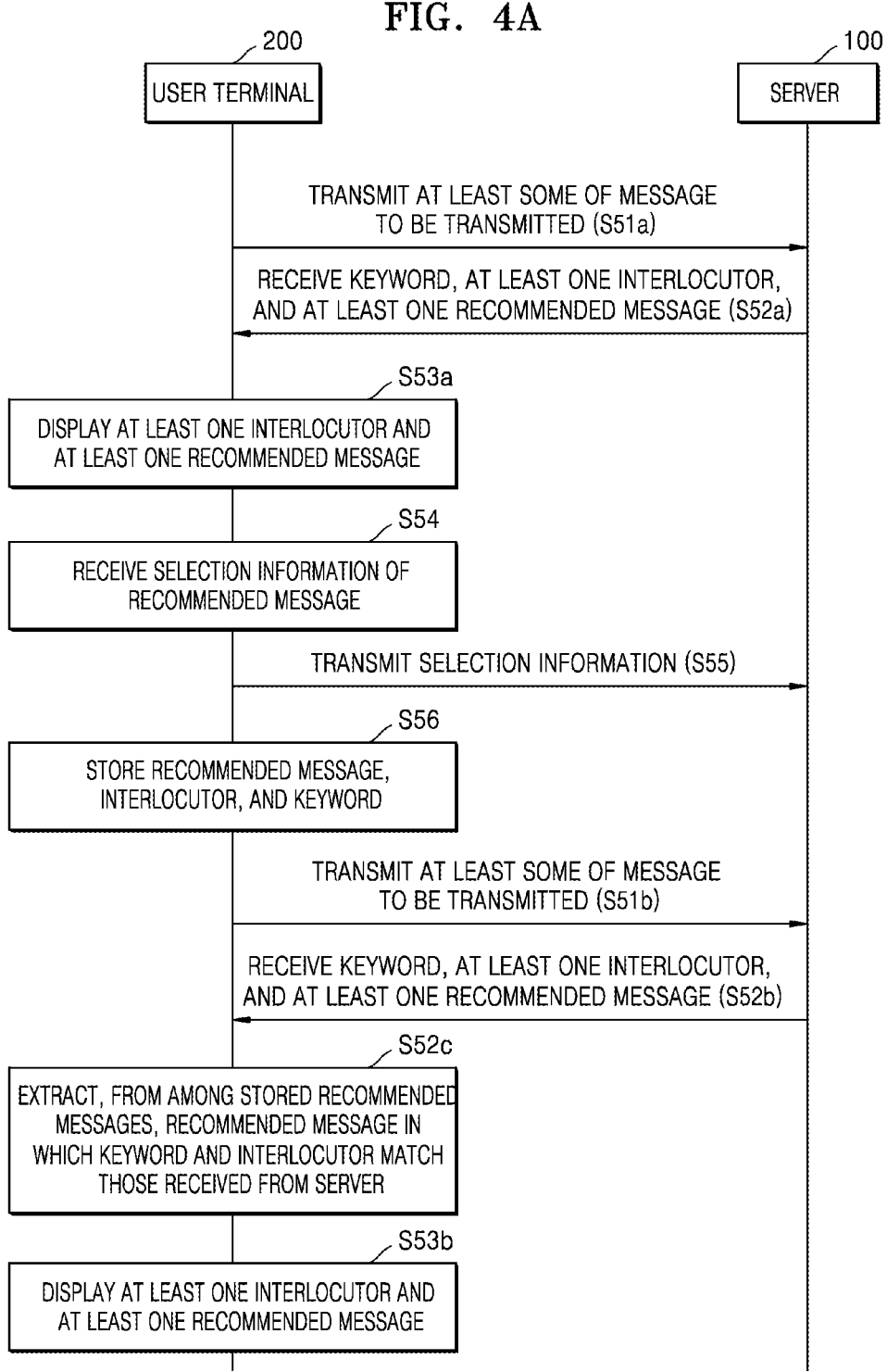

NON-TRANSITORY COMPUTER-READABLE RECORDING MEDIUM, METHOD, SYSTEM, AND APPARATUS FOR EXCHANGING MESSAGE

CROSS-REFERENCE TO RELATED APPLICATION

This U.S. non-provisional application claims the benefit of priority under 35 U.S.C. § 119 to Korean Patent Application No. 10-2015-0189020 filed on Dec. 29, 2015, in the Korean Intellectual Property Office (KIPO), the entire contents of which are incorporated herein by reference.

BACKGROUND

1. Field

One or more example embodiments relate to a non-transitory computer-readable recording medium, method, system and/or apparatus for exchanging a message.

2. Description of the Related Art

According to rapid developments in information and communication technology, various types of terminals, such as mobile communication terminals and personal computers (PCs), have been realized to perform various functions.

For example, mobile communication terminals perform, in addition to basic voice communication function, various functions, such as a data communication function, an image or video capturing function using a camera, a music or video file reproducing function, a game playing function, and a broadcast watching function.

Technology development for expanding functions executable in such terminals are being continuously conducted based not only on hardware improvements, but also on software improvements.

Recently, the frequency and popularity of using messenger programs that allow a plurality of users to exchange messages after accessing a communication network, has been continuously increasing. When such a messenger program is used, the user generally selects an interlocutor (e.g., a user receiving the messages), and inputs and transmits a message to be transmitted to the interlocutor.

Meanwhile, according to the rapid developments in information and communication technology, the user is now able to exchange messages with an artificial intelligence, such as a Bot. However, even while talking to the Bot, the user still has to select the Bot and input a message.

SUMMARY

One or more example embodiments relate to message exchanging method, non-transitory computer readable medium, system, and/or apparatus. In particular, one or more example embodiments include a message exchanging program, method, system, and apparatus, in which, when a user inputs a message without designating an interlocutor, an interlocutor is automatically recommended based on a keyword included in the message input by the user.

One or more example embodiments include a message exchanging method, non-transitory computer readable medium, system, and/or apparatus, in which a complete message may be transmitted even when a user has input only a part of a message, by providing a recommended message according to a recommended interlocutor.

One or more example embodiments include a message exchanging method, non-transitory computer readable medium, system, and/or apparatus, in which a recommended message has increased/improved accuracy by using a history of messages previously transmitted by a user.

Additional aspects will be set forth in part in the description which follows and, in part, will be apparent from the description, or may be learned by practice of the presented example embodiments.

According to one or more example embodiments, a message exchanging apparatus includes: a memory having computer readable instructions stored thereon, at least one controller configured to execute the computer readable instructions to receive, in real-time from a user terminal, at least some of a message to be transmitted to a third party, extract at least one keyword from the received at least some of the message, determine at least one interlocutor based on the at least one keyword, convert the at least some of the message to at least one recommended message related to the at least one interlocutor, and transmit the at least one recommended message to each of the at least one interlocutor.

According to one or more example embodiments, a non-transitory computer readable recording medium having stored thereon computer readable instructions, which when executed, cause at least one processor to execute, a message exchanging method includes: receiving in real-time from a user, at least some of a message to be transmitted to a third party, extracting at least one keyword from the message to be transmitted, determining at least one interlocutor based on the at least one keyword, converting the at least some of the message to at least one recommended message related to the at least one interlocutor, and transmitting the at least one recommended message to each of the at least one interlocutor.

According to one or more example embodiments, a message exchanging method includes: receiving, using at least one processor, in real-time from a user, at least some of a message to be transmitted to a third party, extracting, using the at least one processor, at least one keyword from the message, determining, using the at least one processor, at least one interlocutor related to the at least one keyword, converting, using the at least one processor, the at least some of the message to at least one recommended message related to the at least one interlocutor, and transmitting, using the at least one processor, the at least one recommended message to each of the at least one interlocutor.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 4A is a flowchart of an information processing method of a user terminal, according to at least one example embodiment;

Figure 1:
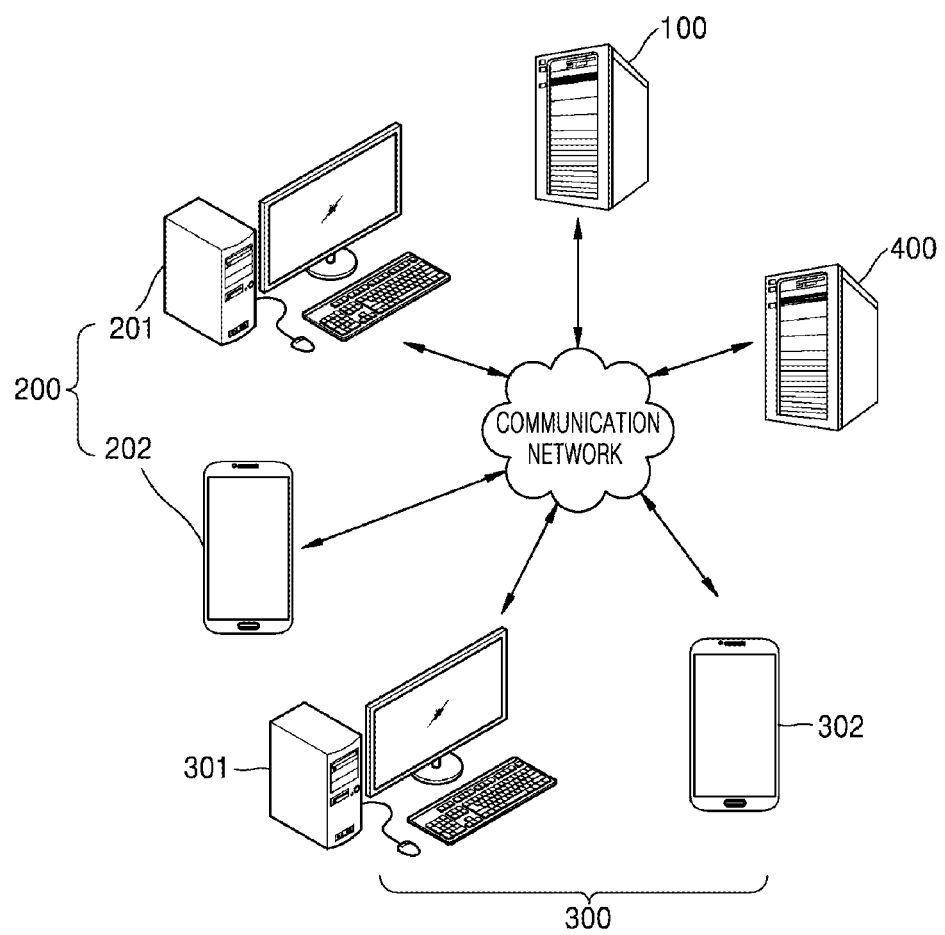
FIG. 1 is a diagram of a structure of an online message exchanging system, according to at least one example embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a diagram of a structure of an online message exchanging system, according to at least one example embodiment.

Referring to FIG. 1, the online message exchanging system includes a server 100, a user terminal 200, an interlocutor terminal 300, a bot interlocutor 400, and a communication network connecting them, but is not limited thereto.

The online message exchanging system may provide, to the user terminal 200 and/or the interlocutor terminal 300, a message exchanging program and/or a message exchanging website. The online message exchanging system may extract information regarding an interlocutor (e.g., information regarding a recipient, such as a username, phone number, email address, IP address, and/or other contact information, etc.) by receiving a message from the user terminal 200, convert the message based on and/or according to the extracted interlocutor information, and transmit the converted message to the interlocutor terminal 300 and/or the bot interlocutor 400.

Referring to FIG. 1, the user terminal 200 and the interlocutor terminal 300 denote communication terminals capable of using a web service in a wired/wireless communication environment. The user terminal 200 may be a personal computer (PC) 201 or a mobile terminal 202. The interlocutor terminal 300 may be a PC 301 or a mobile terminal 302. In FIG. 1, the mobile terminals 202 and 302 are each illustrated as a smart phone, but the example embodiments are not limited thereto, and may be any terminal storing an application capable of web browsing, as described above.

The user terminal 200 and the interlocutor terminal 300 each include at least a display displaying a screen, an input device receiving data from a user, and a communication unit according to at least one example embodiment, but are not limited thereto. The input device may include, for example, a keyboard, a mouse, a track ball, a microphone, a button, and/or a touch panel, but is not limited thereto.

The bot interlocutor 400 is an abbreviation of a robot interlocutor, and is a computer software tool that may perform various functions for a user, such as finding data required and/or requested by the user, assisting with the operation of various components of the user terminal 200 and/or other terminals and/or computing devices associated with the user, such as a personal computer (PC), server, Internet of Things (IoT) capable devices, vehicle, etc. According to at least one example embodiment, the server 100 may convert a message received from the user terminal 200 to be compatible with the bot interlocutor 400, and then may transmit the message to the bot interlocutor 400. The bot interlocutor 400 may then provide a response to the message, such as by providing information requested by the user in the contents of the message, performing a command involving one of the user's associated computing devices, etc.

In FIG. 1, the server 100 and the bot interlocutor 400 are shown as physically separated devices, but example embodiments are not limited thereto, and the server 100 and the bot interlocutor 400 may be embodied in various other forms, such as, being formed in different logical regions in one apparatus.

The bot interlocutor 400 may be a chatterbot (e.g., a chatbot), but is not limited thereto. The chatterbot is a computer program designed to simulate conversation with a human being through audio, text, etc. The chatterbot operates by detecting a certain word or phrase from a message (e.g., voice and/or text, etc.) received from a user, and outputting a response pre-prepared according to the certain word or phrase. Additionally, according to other example embodiments, the bot interlocutor 400 may be a machine learning artificial intelligence (AI) program that may perform sophisticated statistical analysis of information, such as user requests, interpreting messages, analyzing information sources, such as websites, databases, etc., without explicit programming. The machine learning program may execute on a computer system, such as a distributed processing system, a neural network system, etc., and may provide responses (e.g., answers to the user's questions, etc.) and/or perform operations (e.g., providing instructions and/or commands to other software programs and/or hardware devices) in response to a user request.

The communication network connects the server 100, the user terminal 200, the interlocutor terminal 300, and/or the bot interlocutor 400 to each other. For example, the communication network provides an access path for the user terminal 200, the interlocutor terminal 300, and the bot interlocutor 400 to exchange packet data. Examples of the communication network may include wired networks, such as a local area network (LAN), a wide area network (WAN), a metropolitan area network (MAN), and an integrated service digital network (ISDN), and wireless networks, such as wireless LAN, code division multiple access (CDMA), Bluetooth, and satellite communication, but are not limited thereto.

The server 100 provides a message exchanging program and/or a webpage providing a message exchanging service to the user terminal 200 and/or the interlocutor terminal 300. For example, the server 100 may receive at least some of a message to be transmitted from the user terminal 200 through the message exchanging program and/or the webpage providing the message exchanging service, and extract one or more keywords included in the at least part of the message, conversation, chat session, audio and/or audio/visual communication session, etc. Also, the server 100 may provide an interlocutor and a recommended message, which are related to the extracted keyword, to the user (e.g., connect the user to an interlocutor, etc.). In addition, the server 100 may transmit a recommended message to the interlocutor terminal 300 and/or the bot interlocutor 400 according to selection information provided by the user.

The server 100 may receive information about a response message from the interlocutor terminal 300 and/or the bot interlocutor 400 and transmit the response message to the user terminal 200, through the message exchanging program and/or the webpage providing the message exchanging service.

Although not illustrated, the server 100 according to at least one example embodiment may include a memory, an input/output unit, a controller, and a communication unit. The memory temporarily or permanently stores data, instructions, programs, program codes, or combinations thereof, which are processed by the server 100. The memory may be volatile or non-volatile, and may include a solid-state storage medium, a magnetic storage medium, and/or a flash storage medium, but is not limited thereto. The communication unit may be a device including hardware and software required to exchange, with another network device, a signal such as a control signal or a data signal through wired/wireless connection. The controller may include any type of device capable of processing data, such as a processor. Here, the processor may be a data processing apparatus embodied in hardware and having a physically structured circuit to execute a code included in a program or a function expressed in a command. Examples of such data processing apparatus include a microprocessor, a CPU, a processor core, a multiprocessor, an application-specific integrated circuit (ASIC), and a FPGA, but is not limited thereto. Also, the communication unit and the controller may be configured as one controller or processor.

Figure 2A:
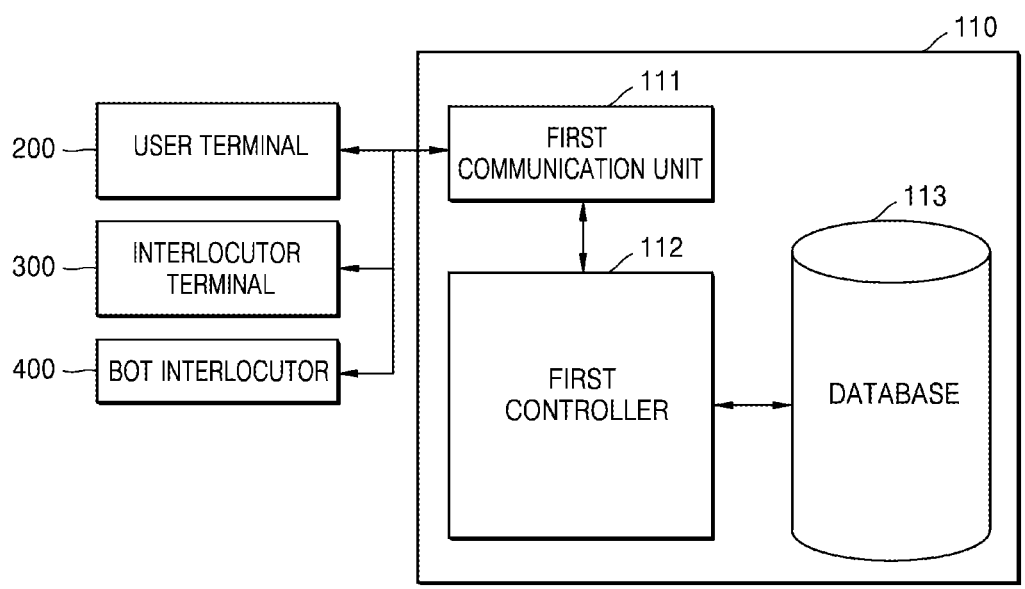
FIG. 2A is a block diagram of a structure of a message exchanging apparatus included in a server of FIG. 1 according to at least one example embodiment.

FIG. 2A is a block diagram of a structure of a message exchanging apparatus 110 included in the server 100 of FIG. 1.

The message exchanging apparatus 110 according to at least one example embodiment may correspond to at least one processor or may include at least one processor. Accordingly, the message exchanging apparatus 110 may be driven by being included in a hardware apparatus, such as a microprocessor, a multi-core processor, a plurality of processors, a distributed processing system, a cloud computer system, etc., or any combination thereof. The message exchanging apparatus 110 may be included in the server 100, but example embodiments are not limited thereto, and may be included in the user terminal 200 based on a design.

The message exchanging apparatus 110 according to at least one example embodiment may receive, from the user terminal 200, at least some of a message and/or communication session to be transmitted. The message exchanging apparatus 110 may extract at least one keyword included in the at least some of the message and/or communication session, and extract at least one interlocutor related to the at least one keyword. The message exchanging apparatus 110 may convert the at least some of the message and/or communication session to at least one recommended message according to the extracted at least one interlocutor, and transmit the at least one recommended message to each of the at least one interlocutor.

The message exchanging apparatus 110 according to at least one example embodiment may include a first communication unit 111, a first controller 112, and a database 113, but is not limited thereto. However, such classification of components is only for convenience/functionality, and the components may be combined into one or more physical components. Functions performed by the components may be overlapped and a component may be included in another component. For example, the first communication unit 111 and the first controller 112 may be integrated and configured as one processor, etc.

The first communication unit 111 according to an at least one example embodiment may exchange messages with the user terminal 200, the interlocutor terminal 300, and/or the bot interlocutor 400. For example, the first communication unit 111 may receive a message from the user terminal 200 and transmit the received message to the bot interlocutor 400, or may receive a message from the bot interlocutor 400 and transmit the received message to the user terminal 200, etc. Here, the first communication unit 111 may transmit, to the user terminal 200, the interlocutor terminal 300, and the bot interlocutor 400, a calculation result obtained based on exchanged messages and/or a message obtained by converting the exchanged messages.

The first communication unit 111 may receive, from the user terminal 200, at least some of a message and/or one or more messages in a conversation, communication session, etc., to be transmitted. The message to be transmitted may be a message to be transmitted from a user to at least one interlocutor. Also, the at least some of the message and/or one or more messages in a conversation, communication session, etc. may be a part of the message, conversation and/or communications session input to the user terminal 200 by the user to be transmitted to the interlocutor. For example, the at least some of the message may be any incomplete sentence generated while the user inputs a sentence and/or message. In other words, when the user intends to transmit a sentence, such as "how about lunch today?" to the interlocutor, an incomplete sentence, such as "how", "how about", or "how about lunch", generated while inputting the sentence may be the at least some of the message. Additionally, keywords may be extracted from a plurality of messages from a user, or a plurality of users, in a single communication session in order to determine a theme of the conversation and/or communication session, and the theme may be used to improve the determination of an interlocutor and/or recommend message as discussed below. For example, when a first user and a second user (e.g., human interlocutor) engage in a communication session and transmit messages with keywords, such as "better schools," "more space," and "better commute," the first controller 112 may determine that the theme of the communication session between the first user and the second user relates to housing and may determine at least one real estate-related interlocutor as being related to the communication session and may recommend the real-estate-related interlocutor to the first and second users. As another example, the first user and the second user may transmit a plurality of messages that include the keywords, "Jones," "Smith," and "Johnson," and may determine that the keywords are all names of players on a particular sports team and may determine that the theme of the conversation is the particular sports team. Then, the first controller 112 may recommend an interlocutor and/or recommended messages related to the sports team being discussed by the first user and the second user.

The first controller 112 according to an at least one example embodiment may extract at least one keyword included in the at least some of the message, and extract and/or determine at least one interlocutor related to the at least one keyword. The keyword may be a word present in the message and/or may be keyword determined based statistical analysis of the words present in the message. The statistical analysis may include performing analysis of the historical message data of the user, such as frequency data of word sequences and/or word combinations transmitted by the user, word sequences and/or word combinations transmitted by the user when in communication with a desired (e.g., particular, specified) interlocutor, word sequences and/or word combinations transmitted by a user group or set of users, etc.

The first controller 112 may use various methods to extract a keyword from a message. For example, the first controller 112 may decompose the message in units of morphemes, and extract only a noun as a keyword. Words used together with desired and/or pre-stored prepositions and postpositions may be recognized as nouns. Additionally, the first controller 112 may decompose the message in units of morphemes, and extract an interrogative pronoun as a keyword. Additionally, the first controller 112 may decompose the message in units of morphemes, and extract only a word indicating a tense as a keyword. A group of words indicating interrogative pronouns or tenses may be pre-stored.

For example, when the user inputs a message, such as "do you remember when and where we are meeting today?", the first controller 112 may extract an interrogative pronoun, for example "when" or "where", from the message as a keyword. Also, the first controller 112 may extract a word indicating a tense, such as "today", from the message as a keyword.

The first controller 112 may extract, as the bot interlocutor 400, a bot having a suitability equal to or higher than a desired and/or pre-set reference suitability with respect to the extracted keyword, by referring to keyword-suitability data according to bot interlocutors, which is stored in the database 113.

Examples of the bot interlocutor 400 include a restaurant bot configured to provide restaurant recommendations and/or reviews, a delivery bot configured to recommend restaurants that deliver and/or to place delivery orders for the user, a travel bot configured to recommend a travel product and/or place travel related reservations, a weather bot configured to provide weather forecasts and/or weather related news, a trivia bot configured to provide trivia games to the user, a news bot configured to provide news to the user, a search bot configured to perform searches for the user, a command bot configured to interface with other networked hardware devices and/or software and control/interact with the hardware devices or software devices, etc. Also, it is assumed that keyword-suitability data according to bots is stored in the database 113 as shown in Table 1 below, and a reference suitability value is 1.6, but the example embodiments are not limited thereto. Such a keyword-suitability table may be pre-prepared, or may be prepared in real-time, by receiving, from a subject (for example, a commercial account owner, a service provider, or a business operator, etc.) operating or providing a bot, at least one keyword suitable (e.g., assigned to, recommend, etc.) for the bot, and suitability data according to the at least one keyword, or may be prepared by storing a bot in the database 113 of the message exchanging apparatus 110 according to a plurality of categories, and using at least one keyword suitable to each category and suitability data self-calculated with respect to the at least one keyword. For example, if the user inputs "today lunch," an example of the suitability data related to certain bots are shown below in Table 1.

TABLE 1

|  | Restaurant Bot | Delivery Bot | Travel Bot | Weather Bot |
| --- | --- | --- | --- | --- |
| Today | 0.9 | 0.9 | 0.8 | 0.9 |
| Lunch | 0.9 | 0.9 | 0.2 | 0.6 |
| Total | 1.8 | 1.8 | 1.0 | 1.5 |

For example, the first communication unit 111 may receive, from the user terminal 200, the message input by the user, and the first controller 112 may extract, as keywords, "today" and "lunch" as described above.

Here, the first controller 112 may calculate suitability by using various methods. For example, the first controller 112 may add a suitability of at least one keyword to calculate a total suitability for each bot, and extract (e.g., select, execute, etc.), as the bot interlocutor 400, a bot having a suitability equal to or higher than the desired and/or pre-set reference suitability value of 1.6. According to Table 1, the total suitability of the restaurant bot is 1.8, the total suitability of the delivery bot is 1.8, the total suitability of the travel bot is 1.0, and the total suitability of the weather bot is 1.5. Accordingly, the first controller 112 may extract the restaurant bot and the delivery bot, which have a total suitability equal to or higher than 1.6 that is equal to the reference suitability value (e.g., the desired threshold value), as the one or more bot interlocutors 400.

Also, the first controller 112 may use an average of suitabilities of at least one keyword as the total suitability and/or may set desired weights to different keywords and then average or take a total of the suitability values for the keywords.

Suitabilities may be updated based on a user's (and/or a group of users') frequency of selecting a bot with respect to a keyword. For example, when the user (or a group of users) frequently selects, as a bot interlocutor, a restaurant bot with respect to a keyword "today", the first controller 112 may increase the suitability of the restaurant bot with respect to the keyword "today". On the other hand, when the frequency of selecting a certain bot interlocutor is low with respect to a certain keyword, the suitability of the certain bot interlocutor may be decreased with respect to the certain keyword. In other words, a frequency of selection factor may be considered when determining which bot interlocutor is selected for the user based on the extracted keywords.

Meanwhile, the first controller 112 may extract, as a human interlocutor, at least one third person who prepared a message related to a keyword by searching the database 113 for a history of messages communicated between the user and the at least one third person. Hereinafter, a human interlocutor denotes a case where an interlocutor is a person and a bot interlocutor denotes a case where an interlocutor is a bot. Also, an interlocutor may include both a human interlocutor and a bot interlocutor.

Various methods may be used by the first controller 112 to extract (e.g., select, contact, assign) a human interlocutor who prepared a message related to a keyword. For example, the first controller 112 may extract, as a human interlocutor, a third person who prepared a message including the keyword or who prepared a message including a synonym of the keyword. At this time, the first controller 112 may extract a related message by using a desired and/or pre-formed dictionary database.

When a keyword is an interrogative pronoun as described above, the first controller 112 may extract, as a human interlocutor, a third person who prepared a message that may be a response to the interrogative pronoun. For example, when an interrogative pronoun "when" is a keyword, the first controller 112 may extract, as a human interlocutor, a third person who prepared a message that includes an answer to the extracted keyword "when," such as a time, a month, a day, for example, "tomorrow". As another example, when an interrogative pronoun "where" is a keyword, the first controller 112 may extract, as a human interlocutor, a third person who prepared a message including a location and/or position, such as "at X", "on X floor", a name of a city, a name of a town, or a pre-stored name of a famous place, may be an answer to the keyword "where". Criteria for selecting a response message with respect to an interrogative pronoun may be pre-stored in the database 113. However, the criteria are not limited thereto, and may vary.

For example, let's assume a case where a user "Martin" and a user "Carlos" talked about "a time and a place to meet tomorrow", and then Carlos inputs a message "do you remember when and where we are meeting today?" into his user terminal 200 on Sep. 28, 2015. Also, it is assumed that the first controller 112 extracted "when", "where", and "today" as keywords.

The first controller 112 searches a history of messages from the users "Martin" and "Carlos" stored in the database 113 for a message about 'Sep. 28, 2015' based on the keyword "today". For example, the first controller 112 searches for a message indicating 'Sep. 28, 2015' as "tomorrow", "one week later", or the like, based on a date when the message is stored. For example, when Martin has a history of sending a message "what time do you want to meet tomorrow?" to Carlos on Sep. 27, 2015, the first controller 112 may extract Martin who prepared the message as a human interlocutor.

The first controller 112 may convert at least some of a message to be transmitted to at least one recommended message, according to at least one extracted interlocutor.

As another example, let's assume a case where a user "Cornel" and a user "Edward" talked about 'a presentation next week', and then Cornel inputs a message "who is preparing for the presentation next week?" into his user terminal 200. Also, it is assumed that the first controller 112 extracted "who", "presentation", and "next week" as keywords.

The first controller 112 searches a history of messages for Cornel and Edward that are stored in the database 113 for a message about next week, based on the keyword "next week". As described above, the first controller 112 searches for a message indicating "next week" by a specific date or as "one week later" based on a date when the message is stored.

Also, the first controller 112 searches the history of messages stored in the database 113 for a message including the "presentation" and a subject corresponding to "who", based on the keywords "presentation" and "who".

For example, when the database 113 has stored therein a message "I'll prepare for the presentation next week" sent from Edward to Cornel, the first controller 112 may extract Edward as the user who prepared the message as a human interlocutor.

When an extracted interlocutor is a bot, i.e., when a bot interlocutor is extracted as an interlocutor, the first controller 112 may convert at least some of a message to be transmitted to at least one recommended message suitable as a query for each bot interlocutor by using protocols according to bot interlocutors included in the database 113.

Generally, a protocol is a set of regulations and agreements with respect to a communication method when information processing apparatuses exchange information, but a protocol according to at least one example embodiment may denote a preparation format of an input message recognizable by a bot and enabling the bot to provide information according to the input message, i.e., a grammatical structure and/or syntax format recognizable by a bot. For example, a restaurant bot may have a protocol, such as a grammatical structure of "[date][place] restaurant [meal type]". Here, when the first communication unit 111 received, from the user terminal 200, a message to be transmitted, such as "today lunch", and the first controller 112 extracted a restaurant bot as a bot interlocutor, the first controller 112 may convert the message to be transmitted to "Nov. 30, 2015, Manhattan restaurant lunch" by referring to information about today's date and a location of a user. Such a protocol may be defined according to bots (e.g., specific to a desired bots), and stored in the database 113 as described above. In the current example embodiment, an example of the restaurant bot has been described, but for example, if a travel bot and a weather bot are recommended with respect to the keywords "today" and "lunch", travel bots and weather bots respectively operated by, for example, the top three travel accounts and for example, the top three weather information providing accounts, which have been most selected by users, may be recommended as interlocutors, but the example embodiments are not limited thereto. When a user selects one or more interlocutors, the travel bot may recommend phrases, such as "plan for one-day trip leaving after 12 today", "reservation for transportation leaving this afternoon", and "plan for overnight trip leaving after lunch today", and recommend information related to a phrase selected by the user, while the weather bot may recommend phrases, such as "weather today afternoon". As such, according to an at least one example embodiment, several bots may be simultaneously recommended and related information may be found at the same time via one keyword input. Thus, a user may learn various types of interest information at once from a plurality of bots by using a few keywords while using a social network service (SNS) application, such as a messenger application, without having to use a separate search engine, and a business operator operating a bot may be able to publicize the bot and respond to user requests and/or messages. In addition, an SNS business operator running the message exchanging apparatus 110, i.e., a central server, may earn commercial profits.

Meanwhile, when at least one extracted interlocutor includes at least one person, i.e., when at least one interlocutor is at least one human interlocutor, the first controller 112 may determine a cluster (e.g., user group) to which each of the at least one human interlocutor belongs, and convert at least some of a message to be transmitted to a recommended message according to clusters, by referring to attributes of the cluster.

Herein, a cluster may be a group for distinguishing interlocutors based on types of languages used between a human interlocutor and a user, such as a formal language, an informal language, and a foreign language. Attributes of a cluster may include message converting regulations and/or grammar in a message to be transmitted to a human interlocutor included in the cluster.

Examples of a cluster may include a 'formal language cluster' using formal languages, such as a "Korean" formal language cluster using Korean or an "English" formal language cluster using English, an 'informal language cluster' using informal languages, such as slang language or languages specific to a specified area (e.g., language/words related to a specific scientific field, a programming language, a mathematical field, a fictional language, etc.).

For example, when the first communication unit 111 received a message "whatcha want for lunch?", the first controller 112 may convert the message to a recommended message, such as "what would you like for lunch?", to transmit the message to an interlocutor belonging to the formal language cluster. Also, the first controller 112 may convert, as a recommended message, the message into Korean for an interlocutor belonging to the Korean cluster.

In order to transmit a message to a human interlocutor belonging to a 'user-defined cluster' personally defined by the user, the first controller 112 may convert the message according to attributes or regulations set in the 'user-defined cluster'. For example, when regulations of adding 'babe' at the end of a sentence is defined as attributes of a user-defined cluster, the first controller 112 may convert the message to "whatcha want for lunch babe?".

The first controller 112 may determine a cluster of each interlocutor based on at least one message received and/or pre-received from each interlocutor or transmitted and/or pre-transmitted to each interlocutor. For example, when the user terminal 200 has transmitted a message "what would you like for lunch?" to a first interlocutor terminal, the server 100 may determine attributes of the first interlocutor terminal with respect to the user terminal 200 to belong to a "formal language cluster".

A cluster determined by the first controller 112 may be changed by the user. For example, when a cluster of a human interlocutor is wrongly determined by the first controller 112, the first communication unit 111 may further receive, from the user terminal 200, information about changing the cluster of the human interlocutor. The first controller 112 may provide information about a pre-formed cluster to the user terminal 200 through the first communication unit 111 such that the user may select the cluster of the human interlocutor. Here, the user may form a new cluster as well as selecting the pre-formed cluster.

In addition, a cluster of each human interlocutor may be determined via user input. For example, when the user inputs a cluster of a desired and/or certain human interlocutor to the user terminal 200, the first communication unit 111 may receive information about the cluster of the certain human interlocutor, and determine the cluster of the certain human interlocutor based on the received information. At this time as well, the first controller 112 may provide information about a desired and/or pre-formed cluster to the user terminal 200 through the first communication unit 111 such that the user may select the cluster of the certain human interlocutor.

The first controller 112 may convert a text message into a multimedia object, as well as text. For example, the first controller 112 may convert all or some of a message into a multimedia object, such as an image, a video, or sound. For example, the first controller 112 may convert a message such that an image corresponding to a keyword located at a location of the keyword in the message based on the keyword included in the message. Also, the first controller 112 may convert a message into a voice message reading the content of the message.

The first communication unit 111 according to an at least one example embodiment may provide at least one recommended message according to interlocutors to the user terminal 200. The first communication unit 111 may transmit a recommended message obtained by the first controller 112 to the user terminal 200. Here, the first communication unit 111 may provide, together with the recommended message, an interlocutor for the recommended message.

For example, the first communication unit 111 may provide, to the user terminal 200, a restaurant bot that is a bot interlocutor, together with a recommended message "Nov. 30, 2015, Manhattan restaurant lunch". Also, when an interlocutor is a human interlocutor, for example, Carlos, and Carlos belongs to a 'formal language cluster', the first communication unit 111 may provide, to the user terminal 200, a recommended message based on the formal language cluster, such as "what would you like for lunch?" when Carlos is associated with the English formal language cluster, together with the interlocutor Carlos.

The first communication unit 111 may receive selection information of a recommended message according to bot interlocutors and/or human interlocutors, from the user terminal 200.

For example, the user may select a suitable combination from among combinations of at least one recommended message and an interlocutor received by the user terminal 200, and transmit a suitable message to the suitable interlocutor.

For example, let's assume that the user wants to confirm a lunch plan in Manhattan with Cornel with whom the user exchanged messages about lunch yesterday, and to look for a restaurant. Also, let's assume that the user input a message "today lunch" to the user terminal 200, and in this regard, 'Kim restaurant' is provided with a recommended message "Nov. 30, 2015, Manhattan restaurant lunch", 'Lee delivery' is provided with a recommended message "Manhattan delivery food", 'Park ranking' is provided with a recommended message "popular lunch", and Cornel is provided with a recommended message "remember our lunch today?" to the user terminal 200.

Here, the user may select a bot interlocutor 'Kim restaurant' and a human interlocutor 'Cornel' to transmit respective recommended messages to 'Kim restaurant' and 'Cornel'.

Meanwhile, the selection information received by the first communication unit 111 from the user terminal 200 may be used by the first controller 112 to update the keyword-suitability data according to bots described above.

For example, the first controller 112 may reference the selection information of the user to increase suitability of a keyword used to extract a bot interlocutor selected by the user, i.e., suitability of a keyword related to the bot interlocutor.

Also, the first controller 112 may reference the selection information of the user to increase suitability of at least one keyword included in a recommended message selected by the user.

The first communication unit 111 may transmit a recommended message to each of at least one interlocutor. For example, the first communication unit 111 may transmit, to a bot interlocutor or a human interlocutor selected according to selection information, a message selected according to bot interlocutors or human interlocutors based on selection information of a recommended message received from the user terminal 200.

Meanwhile, the first communication unit 111 may receive a plurality of response messages from a plurality of interlocutors that received a message.

The first controller 112 may classify the plurality of interlocutors into at least one response category based on the contents of the plurality of response messages received by the first communication unit 111. Also, the first controller 112 may count the number of interlocutors belonging to each response category, according to response categories.

For example, let's assume that with respect to a message "whatcha want for lunch" of the user, an interlocutor Cornel responded "how about pizza?", an interlocutor Martin responded "I want Chinese food", and an interlocutor Carlos responded "how's Chinese food sound?". The first communication unit 111 receives such response messages from Cornel, Martin, and Carlos. The first controller 112 may classify Cornel who responded "how about pizza?" to a 'pizza' category that is a first category, and Martin who responded "I want Chinese food" and Carlos who responded "how's Chinese food sound?" to a 'Chinese food' category that is a second category. Also, such response categories may be processed by the first controller 112 and provided to the user terminal 200.

Meanwhile, the first controller 112 may count the number of interlocutors belonging to each response category, according to response categories. In the above example, the first controller 112 may count the number of interlocutors belonging to each response category, such as "one for pizza category and two for Chinese food category".

The first controller 112 may provide, according to the response categories, information about an interlocutor belonging to each response category, the number of interlocutors belonging to each response category, and the content of a response message. In other words, the first controller 112 may provide, to the user, interlocutors classified in a plurality of categories based on content of response messages, the number of interlocutors according to the categories, and the content of the response messages according to the categories.

As in the above example, let's assume that with respect to the message "whatcha want for lunch?" of the user, the interlocutor Cornel responded "how about pizza?", the interlocutor Martin responded "I want Chinese food", and the interlocutor Carlos responded "how's Chinese food sound?". In this case, the first controller 112 may summarize and provide, to the user, information about the plurality of response messages, such as "pizza [1]—(Cornel), Chinese food [2]—(Martin) (Carlos)".

Hereinafter, the user terminal 200 according to an at least one example embodiment will be described.

Figure 2B:
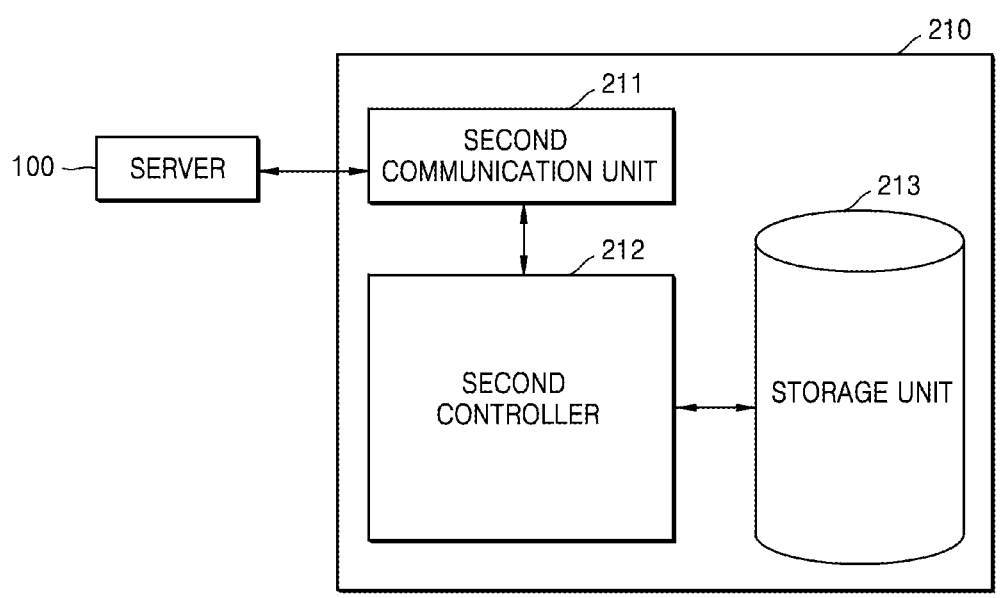
FIG. 2B is a block diagram of a structure of a display control apparatus included in a user terminal of FIG. 1 according to at least one example embodiment.

FIG. 2B is a block diagram of a structure of a display control apparatus 210 included in the user terminal 200 of FIG. 1.

The display control apparatus 210 according to an at least one example embodiment may correspond to at least one processor or may include at least one processor. Accordingly, the display control apparatus 210 may be driven in a form of being included in a hardware apparatus, such as a microprocessor or a general-purpose computer system. The display control apparatus 210 may be included in a user terminal 200, but example embodiments are not limited thereto and may be included in the server 100 according to other example embodiments.

The display control apparatus 210 according to at least one example embodiment may receive a message to be transmitted from the user, and transmit the message to the server 100. The display control apparatus 210 may receive, from the server 100, a keyword extracted from the message, at least one interlocutor related to the keyword, and/or at least one recommended message according to the at least one interlocutor. Here, extraction of the keyword and the at least one interlocutor related to the keyword, and conversion of the message into the at least one recommended message according to the at least one interlocutor may be performed by the message exchanging apparatus 110. The display control apparatus 210 may display, on a screen, the recommended message and the interlocutor received from the server 100. The display control apparatus 210 may receive selection information with respect to the recommended message, from the user, and transmit the selection information to the server 100.

The display control apparatus 210 according to at least one example embodiment may include a second communication unit 211, a second controller 212, and/or a storage unit 213, but are not limited thereto and the components may be combined into one or more components. Functions performed by the components may overlap and a component may be included in another component. For example, the second communication unit 211 and the second controller 212 may be integrated and configured as one processor.

The second communication unit 211 according to an at least one example embodiment may receive a message to be transmitted and transmit the message to the server 100, and may receive, from the server 100, a keyword extracted from the message, at least one interlocutor related to the keyword, and at least one recommended message according to the at least one interlocutor.

As described above, the 'message to be transmitted' in the present disclosure may be a message to be transmitted from the user to an interlocutor. In addition, 'at least some of the message to be transmitted' may be a part of a message input by the user to the user terminal 200 to be transmitted to an interlocutor. For example, the at least some of the message may be an incomplete sentence generated in real-time while the user inputs a sentence. In other words, when the user is to transmit a sentence "how about lunch today?" to the interlocutor by inputting the sentence to the user terminal 200, an incomplete sentence, such as "how", "how about", or "how about lunch", generated while inputting such a sentence may be the at least some of the message. As the user inputs the sentence, the second communication unit 211 may transmit the at least one incomplete sentence described above to the server 100, receive, from the server 100, a keyword, at least one interlocutor related to the keyword, and at least one recommended message according to the at least one interlocutor, and update displays of a recommended message and an interlocutor. In other words, information about a recommended message and an interlocutor may be updated in real-time as the user inputs a sentence.

The second controller 212 according to an at least one example embodiment may display, on the screen, information received from the server 100. For example, the second controller 212 may display, on the screen, the at least one interlocutor related to the keyword and the at least one recommended message according to the at least one interlocutor, which are received from the server 100 by the second communication unit 211. Also, the second controller 212 may display, on the screen, from among recommended messages stored in the storage unit 213, a recommended message in which a keyword and an interlocutor match a keyword and an interlocutor received from the server 100.

The second controller 212 may receive selection information from the user with respect to a received recommended message. The second communication unit 211 may transmit, to the server 100, the selection information received from the user. Also, when the user selects a recommended message stored in the storage unit 213, the second communication unit 211 may transmit the selected recommended message to the server 100. Here, the server 100 may transmit the recommended message to the interlocutor terminal 300 and the bot interlocutor 400 based on information received by the server 100.

Meanwhile, the second controller 212 may store, together with the keyword, the selected recommended message according to interlocutors, in the storage unit 213. The second controller 212 stores a message, a keyword, and a corresponding interlocutor, which have been selected at least once by the user, so as to provide a suitable recommended message to the user.

A stored recommended message may be displayed together when the second communication unit 211 displays, on the screen, the at least one interlocutor related to the keyword and the at least one recommended message according to the at least one interlocutor, which are received from the server 100. Here, a recommended message, in which a keyword and an interlocutor match the keyword and the interlocutor received by the second communication unit 211 from the server 100, may be displayed from among stored recommended messages.

The user terminal 200 according to another at least one example embodiment will now be described.

The second controller 212 according to another at least one example embodiment may receive at least some of a message to be transmitted from the user, extract at least one keyword from the at least some of the message, and extract at least one interlocutor related to the at least one keyword. In the previous example embodiment, the user terminal 200 transmits some of a message to be transmitted to the server 100, and receives an interlocutor and a recommended message according to the interlocutor from the server 100, but in the current example embodiment, the user terminal 200 performs a series of processes of extracting a keyword, extracting an interlocutor, and converting a message into a recommended message. Accordingly, a message may be prepared even when a network connection between the user terminal 200 and the server 100 is temporarily disconnected and/or the user terminal 200 and/or the server 100 are otherwise unresponsive.

The second controller 212 may convert at least some of a message and/or conversation received according to at least one interlocutor to at least one recommended message. Here, the second controller 212 extracts at least one keyword from the message(s), extracts at least one interlocutor related to the at least one keyword, and converts the message(s) to at least one recommended message according to the at least one interlocutor in the same manner as the message exchanging apparatus 110 described above.

The display control apparatus 210 may display, on the screen, the recommended message and the interlocutor obtained by the second controller 212. Here, the display control apparatus 210 may further display, from among stored recommended messages, a recommended message in which a keyword and an interlocutor match the extracted keyword and interlocutor. In other words, the display control apparatus 210 may display, on the screen, a recommended message that has been frequently used by the user or has a history of being used by the user such that the user quickly inputs a message.

The display control apparatus 210 may receive selection information with respect to a recommended message from the user, and transmit the selection information to an interlocutor. Here, 'transmit to an interlocutor' may mean that a message is transmitted to the server 100 to be transmitted to an interlocutor, or a message is directly transmitted to the interlocutor terminal 300 or the bot interlocutor 400.

Meanwhile, the display control apparatus 210 may store, together with a keyword according to interlocutors, a recommended message selected according to selection information. A stored recommended message may be displayed on the screen when a next message is prepared, as described above.

In the user terminal 200 according to the current at least one example embodiment, a keyword and an interlocutor extracted by the second controller 212 may also be transmitted to the server 100, and a recommended message obtained by referring to the extracted keyword and the extracted interlocutor may also be received from the server 100. The second controller 212 may further display, on the screen, the recommended message received from the server 100.

FIGS. 3A through 4B are flowcharts of information processing methods between the server 100, the user terminal 200, the interlocutor terminal 300, and the bot interlocutor 400. Meanwhile, in FIGS. 3A through 4B, the server 100 may include the message exchanging apparatus 110 of FIG. 2A and the user terminal 200 may include the display control apparatus 210 of FIG. 2B, and thus descriptions about the message exchanging apparatus 110 and the display control apparatus 210, which have been described above with reference to FIGS. 2A and 2B, may also be applied to FIGS. 3A through 4B, even if omitted below.

Figure 3A:
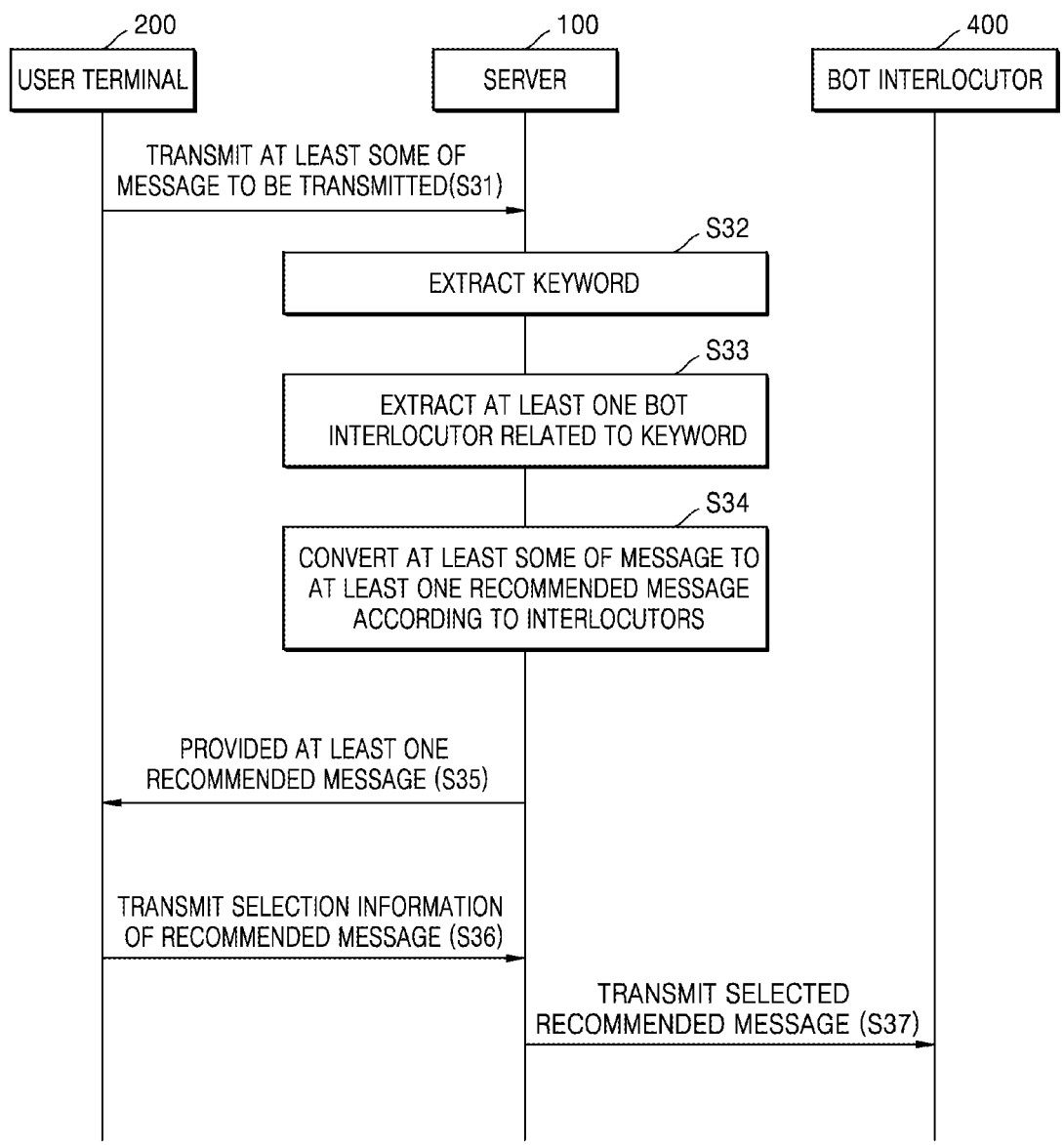
FIG. 3A is a flowchart of an information processing method when an interlocutor is a bot interlocutor according to at least one example embodiment.
Figure 3B:
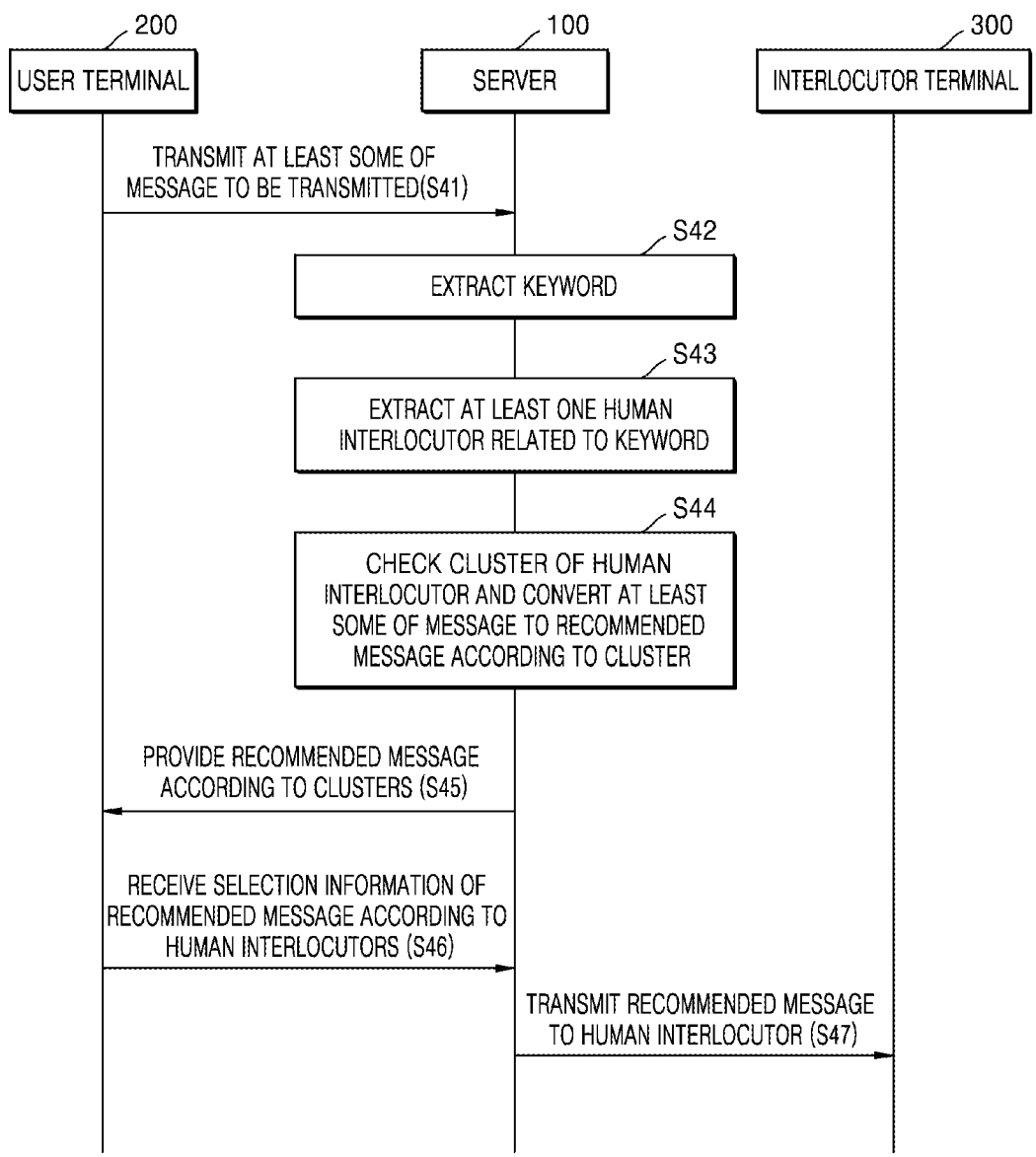
FIG. 3B is a flowchart of an information processing method when an interlocutor is a human interlocutor according to at least one example embodiment.

FIG. 3A is a flowchart of an information processing method when an interlocutor is a bot interlocutor, and FIG. 3B is a flowchart of an information processing method when an interlocutor is a human interlocutor.

Referring to FIG. 3A, the user terminal 200 may transmit at least some of a message (or a plurality of messages as part of a conversation or communication session) to be transmitted to the server 100, in operation S31. As described above, the at least some of the message may be an incomplete sentence and/or complete sentence generated while the user inputs a message into the user terminal 200. In other words, when the user is to transmit a sentence "how about lunch today?" to the interlocutor by inputting the sentence into the user terminal 200, an incomplete sentence, such as "how", "how about", or "how about lunch", generated while inputting such a sentence may be the at least some of the message.

The server 100 may extract at least one keyword included in the at least some of the message received from the user terminal 200, in operation S32. As described above, various methods may be used to extract a keyword. For example, the server 100 may decompose the message into units of morphemes, and extract only a noun as a keyword. Additionally, the server 100 may decompose the message into units of morphemes, and extract an interrogative pronoun as a keyword. For example, when the user inputs a message "do you remember when and where we are meeting today?", the first controller 112 may extract an interrogative pronoun, such as "when" or "where", from the message as a keyword. Also, the first controller 112 may extract a word indicating a tense, such as "today", from the message as a keyword.

The server 100 may extract at least one bot interlocutor 400 related to the extracted keyword, in operation S33. Here, the server 100 may extract the bot interlocutor 400 as a bot having a suitability equal to or higher than a desired and/or pre-set reference suitability value (e.g., a threshold value) with respect to the keyword by referring to keyword-suitability data according to the bot interlocutors 400, which is stored in the database 113.

For example, it is assumed that the user inputs a message "today lunch" to the user terminal 200, and examples of the bot interlocutor 400 include a restaurant bot recommending a restaurant, a delivery bot recommending a delivery-only restaurant, a travel bot recommending a travel product, and a weather bot providing news about the weather, etc. Also, it is assumed that keyword-suitability data according to bots is stored in the database 113 as shown in Table 1 above, and the reference suitability value is 1.6. The server 100 may extract "today" and "lunch" as keywords from the message. Here, the server 100 may calculate the suitability of each keyword by using various methods. For example, the server 100 may add the suitability of one or more keywords and extract the bot interlocutor 400 as a bot having a suitability equal to or higher than the desired and/or pre-set reference suitability value of 1.6 by calculating a total suitability of each bot. In the current example, the restaurant bot has a suitability of 1.8, the delivery bot has a suitability of 1.8, the travel bot has a suitability of 1.0, and the weather bot has a suitability of 1.5. Accordingly, the server 100 may extract the restaurant bot and the delivery bot having suitabilities equal to or higher than the reference suitability value of 1.6 as bot interlocutors 400. Also, the server 100 may use an average of suitabilities of each keyword as the total suitability.

The server 100 may convert the at least some of the message to at least one recommended message, according to the extracted at least one bot interlocutor 400, in operation S34. When an extracted interlocutor is a bot, i.e., the bot interlocutor 400, the server 100 may convert the at least some of the message to at least one recommended message according to the bot interlocutors 400, by using a protocol according to the bot interlocutors 400, which is stored in the database 113. For example, a restaurant bot may have a protocol, such as "[date][place] restaurant [meal type]". Here, when the server 100 receives, from the user terminal 200, a message to be transmitted, such as "today lunch", and extracts a restaurant bot as the bot interlocutor 400, the server 100 may convert the message to be transmitted to "Nov. 30, 2015, Manhattan restaurant lunch" by referring to information about today's date and a location of the user. Such a protocol may be defined according to bots, and stored in the database 113 as described above.

The server 100 may provide, to the user terminal 200, the at least one recommended message according to the bot interlocutors 400, in operation S35. Accordingly, the server 100 may transmit the at least one recommended message to the user terminal 200. Here, the server 100 may provide, together with the at least one recommended message, the bot interlocutor 400 with respect to the at least one recommended message. For example, the server 100 may provide, to the user terminal 200, the restaurant bot that is the bot interlocutor 400, together with the recommended message "Nov. 30, 2015, Manhattan restaurant lunch".

The server 100 may receive selection information of a recommended message according to the bot interlocutors 400, from the user terminal 200, in operation S36. For example, when the user selects a suitable combination from among combinations of at least one recommended message and corresponding bot interlocutors, which are received by the user terminal 200, the server 100 may receive, from the user terminal 200, information about the recommended message and the corresponding bot interlocutor 400 selected by the user.

Lastly, the server 100 may transmit a recommended message to each of the at least one bot interlocutor, in operation S37. The server 100 may transmit, to the bot interlocutor 400 according to the selection information, the recommended message selected according to the bot interlocutor 400 based on the selection information received from the user terminal 200.

FIG. 3B illustrates a case where an interlocutor is a human interlocutor. Referring to FIG. 3B, the user terminal 200 may transmit at least some of a message to be transmitted to the server 100, in operation S41. Also, the server 100 may extract at least one keyword included in the at least some of the message received from the user terminal 200, in operation S42.

The server 100 may extract at least one human interlocutor related to the extracted at least one keyword, in operation S43. The server 100 may extract, as the at least one human interlocutor, at least one third person who prepared a message related to the at least one keyword by searching the database 113 storing a history of messages communicated between the user and the at least one third person. Various methods may be used to extract, by the server 100, a human interlocutor who prepared a message related to the keyword. For example, the server 100 may extract, as the human interlocutor, a third person who prepared a message including the keyword, a third person who prepared a message including a synonym of the keyword, a third person who prepared a message including one or more keywords related to the subject of the keyword, a third person who prepared a message including one or more keywords related to the theme of the keyword, etc.

When at least one person is included in the extracted at least one interlocutor, i.e., when the at least one interlocutor is at least one human interlocutor, the server 100 may determine a cluster to which each of the at least one human interlocutor belongs, and convert the at least some of the message to a recommended message according to clusters by referring to attributes of the clusters, in operation S44. Examples of a cluster may include a 'formal language cluster' using formal languages, an 'informal language cluster' using informal languages, and a 'Korean cluster' using Korean.

For example, when the server 100 receives a message "whatcha want for lunch?", the server 100 may convert the message (e.g., perform spelling error correction) to a recommended message, such as "what would you like for lunch?", to transmit the message to an interlocutor belonging to the formal language cluster. Also, the server 100 may convert (e.g., translate into a second language), as a recommended message, the message from English into Korean for an interlocutor belonging to the Korean cluster, convert the message into a recommended message that is in the informal language for an interlocutor belonging to an informal language cluster, convert a text message into a recommended audio message for an interlocutor who belongs to an audio preferring cluster (or vice versa), etc. In order to transmit a message to a human interlocutor belonging to a 'user-defined cluster' personally defined by the user, the server 100 may convert the message according to attributes or regulations set in the 'user-defined cluster'.

Meanwhile, the server 100 may determine a cluster of each interlocutor based on at least one message received and/or pre-received from each interlocutor or transmitted and/or pre-transmitted to each interlocutor. For example, when the user terminal 200 has transmitted a message "what would you like for lunch?" to a first interlocutor terminal, the server 100 may determine attributes of the first interlocutor terminal with respect to the user terminal 200 to be a "formal language cluster".

A cluster determined by the server 100 may be changed by the user. For example, when a cluster of a human interlocutor determined by the server 100 is wrong, the server 100 may further receive, from the user terminal 200, information about changing the cluster of the human interlocutor. The server 100 may provide information about a pre-formed (and/or assigned) cluster to the user terminal 200 such that the user may select the cluster of the human interlocutor. Here, the user may form a new cluster as well as selecting a pre-formed cluster from one or more pre-formed clusters.

In addition, a cluster of each human interlocutor may be determined via a user input. For example, when the user inputs a cluster of a certain human interlocutor to the user terminal 200, the server 100 may receive information about the cluster of the certain human interlocutor, and determine the cluster of the certain human interlocutor based on the received information. At this time as well, the server 100 may provide information about a pre-formed cluster to the user terminal 200 such that the user may select the cluster of the certain human interlocutor.

The server 100 may provide the at least one recommended message according to (e.g., based on) clusters to the user terminal 200, in operation S45. Accordingly, the server 100 may transmit the recommended message to the user terminal 200. Here, the server 100 may provide, together with the recommended message, a human interlocutor with respect to the recommended message.

When an interlocutor is a human interlocutor, for example, Carlos, and Carlos belongs to a 'formal language cluster', the server 100 may transmit, to the user terminal 200, a recommended message "what would you like for lunch?" together with the human interlocutor Carlos.

The server 100 may receive selection information of a recommended message according to human interlocutors, from the user terminal 200, in operation S46. For example, when the user selected a suitable combination from among combinations of at least one recommended message and corresponding interlocutors, which are received from the user terminal 200, the server 100 may receive, from the user terminal 200, information about a recommended message and a corresponding interlocutor selected by the user.

Lastly, the server 100 may transmit a recommended message to each of the at least one human interlocutor, in operation S47. The server 100 may transmit, to a human interlocutor according to the selection information, the recommended message selected according to the human interlocutors based on the selection information received from the user terminal 200.

FIG. 4A is a flowchart of an information processing method of the user terminal 200, according to an at least one example embodiment.

Referring to FIG. 4A, the user terminal 200 may receive and transmit, to the server 100, a message to be transmitted in operation S51a, and receive, from the server 100, a keyword extracted from the message, at least one interlocutor related to the keyword, and at least one recommended message according to the at least one interlocutor, in operation S52a.

As described above, the message to be transmitted may be a message to be transmitted from the user to an interlocutor. In addition, at least some of the message may be a part of the message input to the user terminal 200 to be transmitted from the user to the interlocutor.

The user terminal 200 may display, on the screen, information received from the server 100, in operation S53a. For example, the user terminal 200 may display, on the screen, the at least one interlocutor related to the keyword and the at least one recommended message according to the at least one interlocutor, which are received from the server 100. Also, the user terminal 200 may display, on the screen, a recommended message in which a keyword and an interlocutor match the keyword and the interlocutor received from the server 100, from among recommended messages stored in the storage unit 213.

The user terminal 200 may receive selection information of a recommended message from the user, in operation S54. The user terminal 200 may transmit the selection information to the server 100, in operation S55. When the user selects a recommended message stored in the storage unit 213, the user terminal 200 may transmit the selected recommended message to the server 100. The server 100 may transmit the recommended message to the interlocutor terminal 300 and the bot interlocutor 400 based on information received by the server 100.

Hereinafter, processes of the user selecting a recommended message stored in the user terminal 200 will be described.

As described above, the user terminal 200 receives and transmits, to the server 100, a message to be transmitted from the user, in operation S51a, and receives, from the server 100, a keyword extracted from the message, at least one interlocutor related to the keyword, and at least one recommended message according to the at least one interlocutor, in operation S52a.

The user terminal 200 may extract, from among a plurality of recommended messages stored in the storage unit 213, or from converting (e.g., correcting, translating, etc.) the message into at least one recommended message, a recommended message in which a keyword and an interlocutor match the keyword and the interlocutor received from the server 100, in operation S52c.

The user terminal 200 may display, on the screen, information received from the server 100, and information extracted by the user terminal 200, in operation S53a. For example, the user terminal 200 may display, on the screen, the at least one interlocutor related to the keyword and the at least one recommended message according to the at least one interlocutor, which are received from the server 100. Also, the user terminal 200 may display, on the screen, the recommended message in which the keyword and the interlocutor match those received from the server 100, from among the recommended messages stored in the storage unit 213.

Then, as described above, the user terminal 200 receives the selection information and transmits the selection information to the server 100, and the server 100 transmits the recommended message.

Figure 4B:
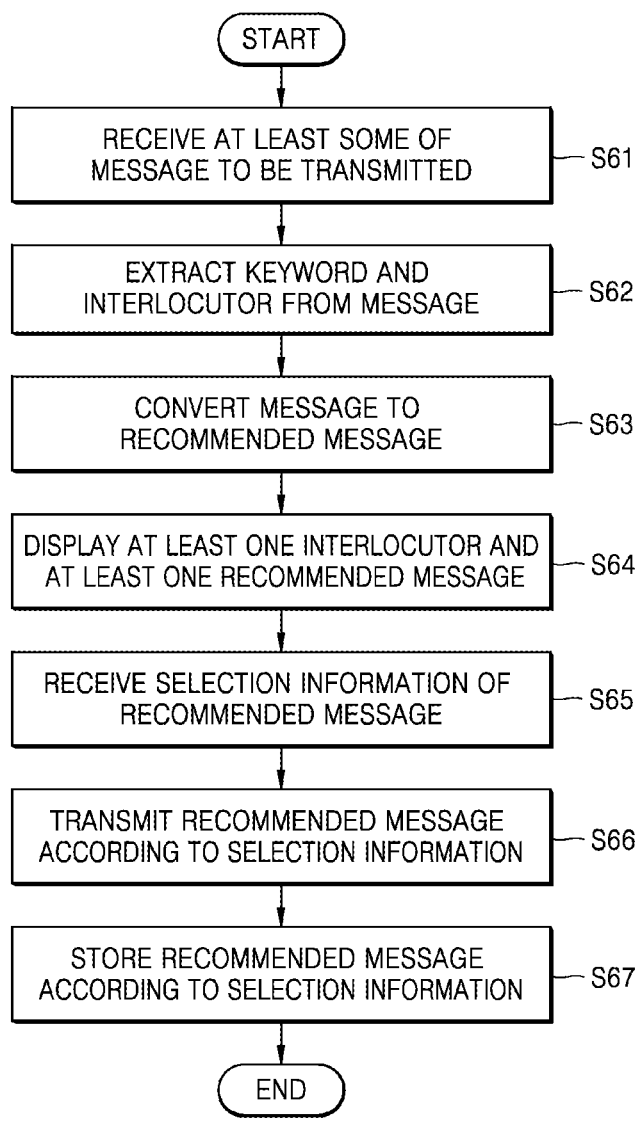
FIG. 4B is a flowchart of an information processing method of a user terminal, according to at least one example embodiment.

FIG. 4B is a flowchart of an information processing method of the user terminal 200, according to another at least one example embodiment.

Referring to FIG. 4B, the user terminal 200 according to another at least one example embodiment may receive, from the user, at least some of a message to be transmitted in operation S61, and extract at least one keyword from the at least some of the message and extract at least one interlocutor related to the at least one keyword in operation S62.

The user terminal 200 may convert the at least some of the message to at least one recommended message according to the at least one interlocutor, in operation S63. Here, the user terminal 200 may extract the at least one keyword and the at least one interlocutor related to the at least one keyword, and convert the message to the at least one recommended message according to the at least one interlocutor in the same manner as the message exchanging apparatus 110 described above.

The user terminal 200 may display, on the screen, the at least one recommended message and the at least one interlocutor, in operation S64. Here, the user terminal 200 may further display, on the screen, a recommended message in which a keyword and an interlocutor match the extracted keyword and interlocutor, from among stored recommended messages. In other words, the user terminal 200 may enable the user to quickly input a message by displaying a recommended message that has been frequently used by the user or has a history of being used by the user.

The user terminal 200 receives, from the user, selection information of a recommended message in operation S65, and transmits the recommended message to an interlocutor according to the selection information, in operation S66. Here, the user terminal 200 may store the recommended message selected according to the selection information together with the keyword according to interlocutors, in operation S67. The recommended message stored as such may be displayed on the screen when a next message is prepared, as described above.

FIGS. 5A through 8 illustrate screens displayed on the user terminal 200, according to at least one example embodiments.

Figure 5A:
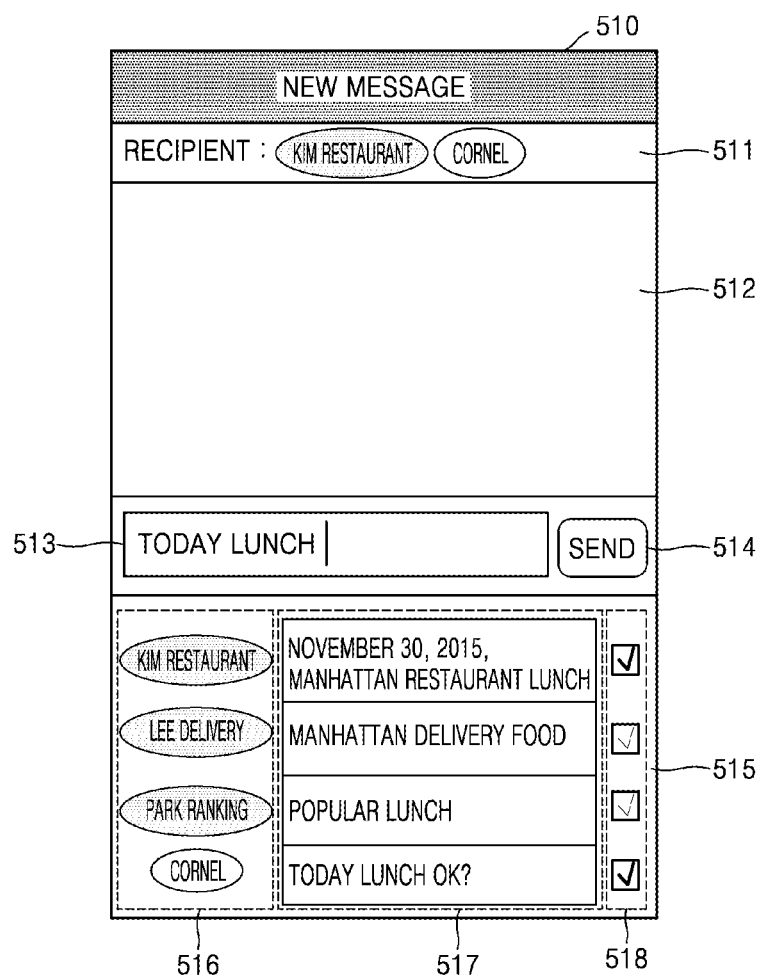
FIGS. 5A and 5B illustrate a screen in which a message to be transmitted to a user terminal is input, and a recommended message and an interlocutor are received from a server, according to at least one example embodiment.
Figure 5B:
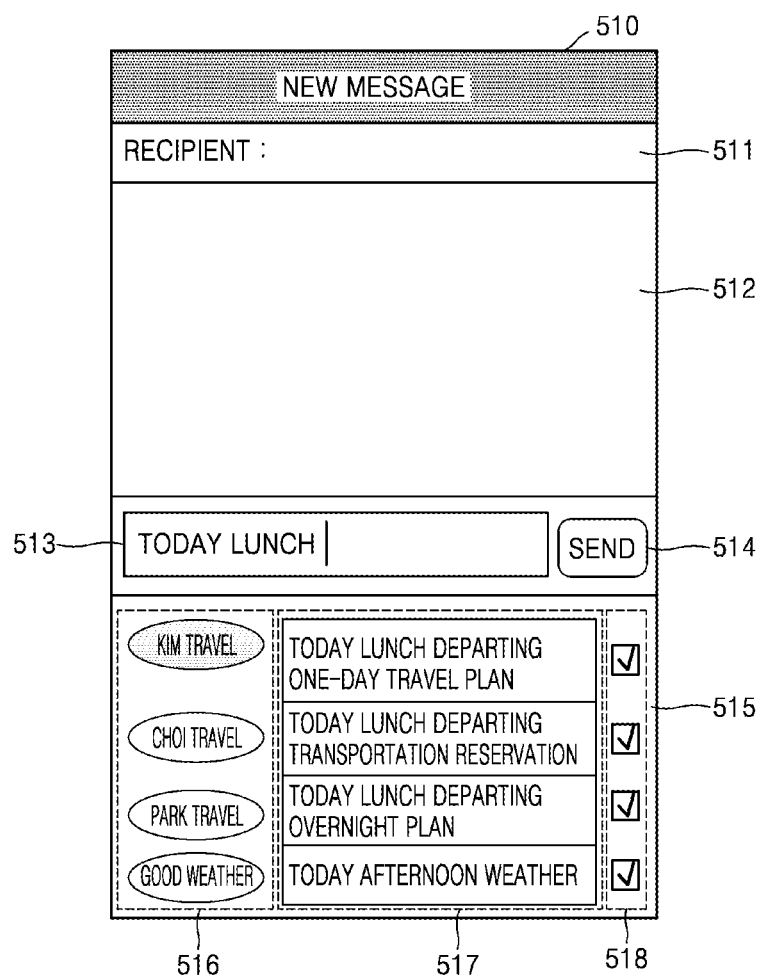

FIGS. 5A and 5B illustrate a screen 510 in which a message to be transmitted to the user terminal 200 is input, and a recommended message and an interlocutor are received from the server 100, according to an at least one example embodiment.

Referring to FIG. 5A, the screen 510 may include an interlocutor display window 511 in which an interlocutor is displayed, a conversation content display window 512 in which conversation content is displayed, a message input window 513 into which a message to be transmitted is input by the user, a transmit button 514 for transmitting a message input to the message input window 513 by the user or a recommended message selected by the user, and a recommended message display window 515 in which a recommended message and a corresponding interlocutor are displayed with respect to the message input by the user. Here, the recommended message display window 515 may include a region 516 displaying an interlocutor, a region 517 displaying a recommended message, and a checkbox region 518 displaying a checkbox for selecting a recommended message.

In FIG. 5A, the user has input "today lunch" while inputting a message "today lunch OK with you?" into the message input window 513. The user terminal 200 has transmitted the incomplete message "today lunch" to the server 100, and received, from the server 100, "Nov. 30, 2015, Manhattan restaurant lunch", "Manhattan delivery food", "popular lunch", and "today lunch OK?" as recommended messages, and 'Kim restaurant', 'Lee delivery', 'Park ranking', and 'Cornel' as recommended interlocutors respectively for the recommended messages. Here, 'Kim restaurant', 'Lee delivery', and 'Park ranking' are bot interlocutors, and 'Cornel' is a human interlocutor. The user may suitably check a checkbox of the checkbox region 518 (or other graphical user interface element) to transmit a recommended message to all or some of the interlocutors. In other words, in FIG. 5A, the user has selected checkboxes for 'Kim restaurant' and 'Cornel', and thus 'Kim restaurant' and 'Cornel' are displayed as interlocutors on the interlocutor display window 511. The user may select the transmit button 514 to transmit the recommended message.

Similarly to FIG. 5A, in FIG. 5B, the user has input "today lunch" while inputting the message "today lunch OK with you?" to the message input window 513. The user terminal 200 has transmitted the incomplete message "today lunch" to the server 100, and received, from the server 100, "today lunch departing one-day travel plan", "today lunch departing transportation reservation", "today lunch departing overnight plan", and "today afternoon weather" as recommended messages, and 'Kim travel', 'Choi travel', 'Park travel', and 'Good weather' as interlocutors respectively for the recommended messages. In other words, if FIG. 5A shows an example focusing on 'lunch' as a meal, FIG. 5B shows an example focusing on lunch as 'time' to extract, in addition to a restaurant bot, a travel bot and a weather bot as bot interlocutors. At this time as well, the user may suitably check checkboxes of the checkbox region 518 to transmit a recommended message to all or some of the interlocutors.

Figure 6:
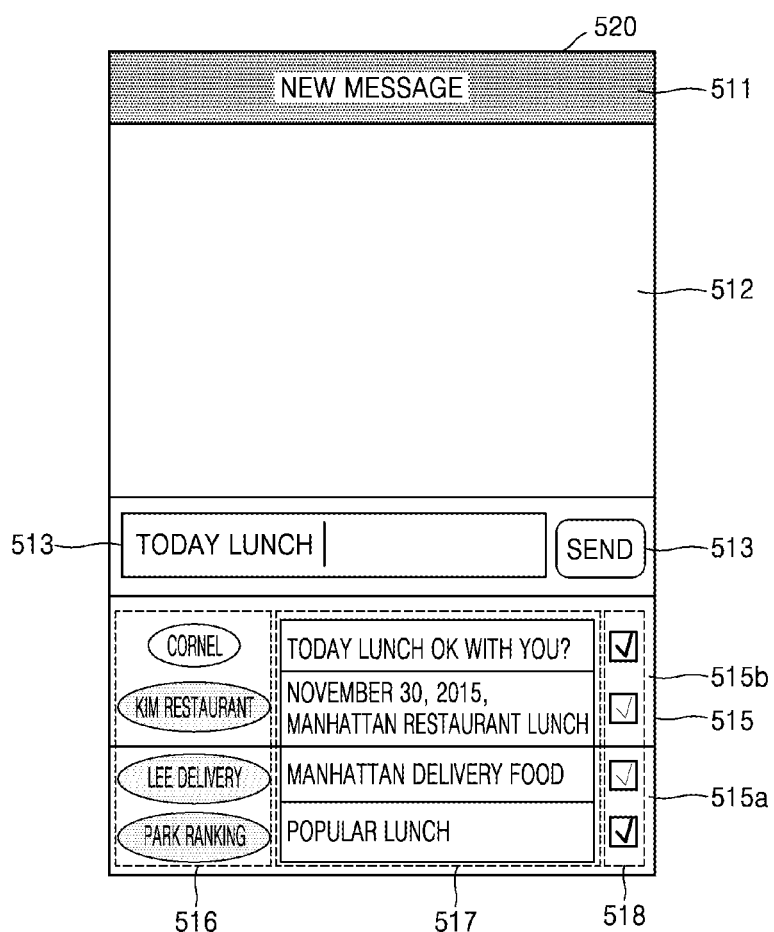
FIG. 6 illustrates a screen in which a recommended message stored in a storage unit and a recommended message received from a server are displayed, according to at least one example embodiment.

FIG. 6 illustrates a screen 520 in which a message to be transmitted is input to the user terminal 200, and a recommended message stored in the storage unit 213 and a recommended message received from the server 100 are displayed, according to at least one example embodiment.

Referring to FIG. 6, the screen 520 includes the interlocutor display window 511 displaying an interlocutor, the conversation content display window 512 displaying conversation content, the message input window 513 into which a message to be transmitted is input by the user, the transmit button 514 for transmitting a message input to the message input window 513 by the user or a recommended message selected by the user, and the recommended message display window 515 displaying a recommended message and a corresponding interlocutor according to the message to be transmitted input by the user. Here, the recommended message display window 515 may include a display window 515a displaying a recommended message and a corresponding interlocutor, which are received from the server 100, and a display window 515b displaying a recommended message stored in the storage unit 213. At this time as well, the recommended message display window 515 may include the region 516 displaying an interlocutor, the region 517 displaying a recommended message, and the checkbox region 518 displaying a checkbox for selecting a recommended message.

In FIG. 6, the user has input "today lunch" while inputting a message "today lunch OK with you?" to the message input window 513. The user terminal 200 has transmitted the incomplete message "today lunch" to the server 100, and received, from the server 100, and displayed "Manhattan delivery food" and "popular lunch" as recommended messages, and 'Lee delivery' and 'Park ranking' as interlocutors respectively for the recommended messages. Also, the user terminal 200 displays, from among recommended messages stored in the storage unit 213, recommended messages "today lunch OK with you?" and "Nov. 30, 2015, Manhattan restaurant lunch", in which a keyword and an interlocutor match those received from the server 100.

Figure 7:
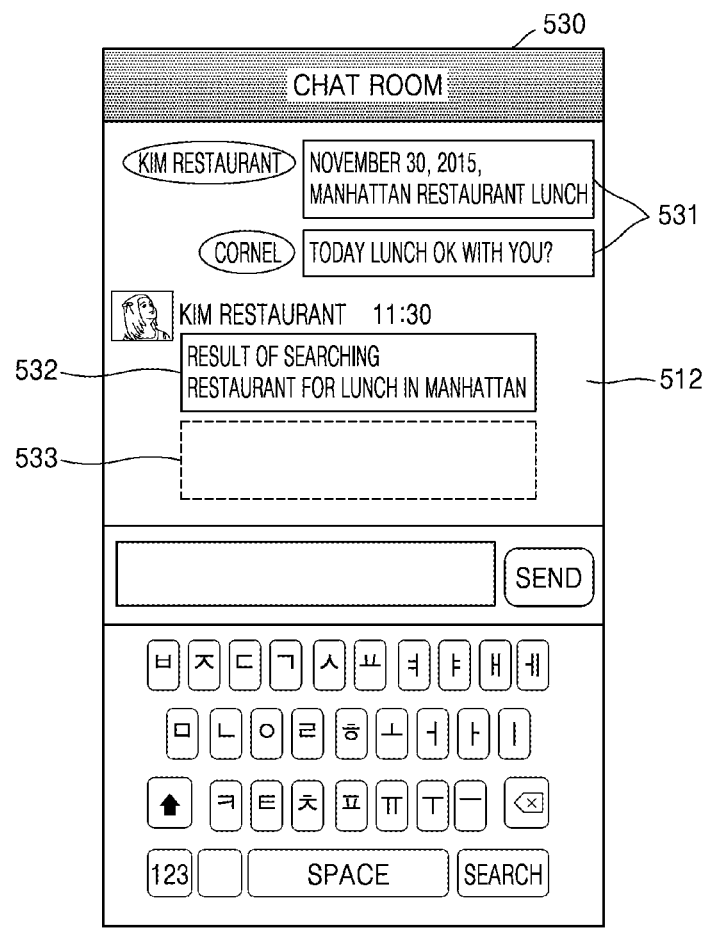
FIG. 7 illustrates a screen in which a user has selected and transmitted a recommended message, and received a response message from a bot interlocutor, according to at least one example embodiment.

FIG. 7 illustrates a screen 530 in which a user has selected and transmitted a recommended message, and received a response message from a bot interlocutor, according to an at least one example embodiment.

Referring to FIG. 7, the screen 530 may include the conversation content display window 512 displaying conversation content. The conversation content display window 512 may display a recommended message 531 selected and transmitted by the user, and response messages 532 and 533 received from interlocutors.

In FIG. 7, the user has transmitted a message "Nov. 30, 2015, Manhattan restaurant lunch" to 'Kim restaurant' that is a bot interlocutor, and a message "today lunch OK with you?" to 'Cornel' that is a human interlocutor, and received the response message 533 showing a restaurant search result from 'Kim restaurant'.

Figure 8:
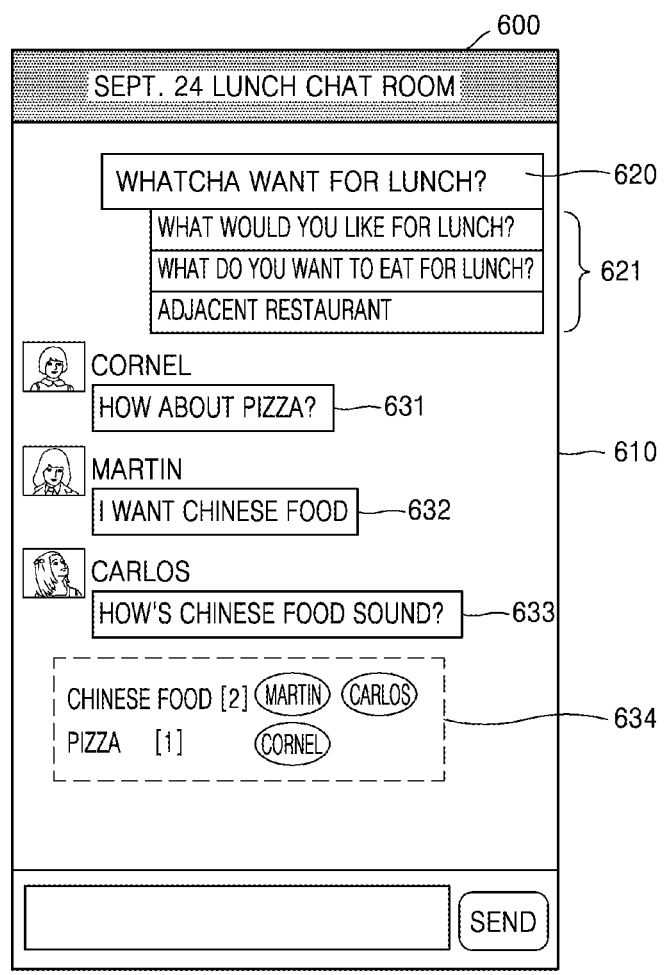
FIG. 8 illustrates a chat screen in which a response message is received from a plurality of interlocutors according to at least one example embodiment.

FIG. 8 illustrates a chat screen 600 in which a response message is received from a plurality of interlocutors. Referring to FIG. 8, a chat window 610 of the chat screen 600 may include text boxes displaying messages 620 and 621 transmitted by the user, and messages 631 through 633 received from the plurality of interlocutors. Also, the chat window 610 may include a statistic information window 634 displaying statistic information about the messages 631 through 633 received from the interlocutors. In FIG. 8, the message 631 "how about pizza?" is received from 'Cornel', the message 632 "I want Chinese food" is received from 'Martin', and the message 633 "how's Chinese food sound?" is received from 'Carlos'. Also, based on the messages 631 through 633, statistics information such as "Chinese food [2] (Martin) (Carlos)/Pizza [1] (Cornel)" is displayed. Referring to FIG. 8, despite messages being separately received from a plurality of interlocutors, the messages are displayed on one chat window and in addition, statistics information is provided on the chat window.

In a method and apparatus for exchanging a message, according to one or more example embodiments, when a user inputs a message without designating an interlocutor, an interlocutor is automatically recommended in consideration of at least one keyword included in the message input by the user, and thus the user may not have to always designate an interlocutor.

Also, according to one or more example embodiments, a complete message is provided even when a user has input only a part of a message by providing a recommended message suitable for a recommended interlocutor, and in particular, a recommended message having high accuracy is provided by using a history of messages transmitted and/or pre-transmitted by the user, and thus the user may conveniently input a message.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described.

The same may also be varied in many ways. Such variations are not to be regarded as a departure from the disclosure, and all such modifications are intended to be included within the scope of the disclosure.

What is claimed is:

1. A message exchanging apparatus comprising:
a memory having computer readable instructions stored thereon; and
at least one controller configured to execute the computer readable instructions to,
receive, in real-time from a user terminal, at least some of a message to be transmitted from a first user to at least one second user, wherein the at least some of the message is any incomplete sentence generated while the first user inputs the message, the first user and the at least one second user being human users;
extract an interrogative pronoun from the received at least some of the message;
extract at least one keyword from the received at least some of the message;
select at least one interlocutor from a plurality of interlocutors based on the extracted interrogative pronoun and the extracted at least one keyword, the plurality of interlocutors including at least one human interlocutor different from the first user and the at least one second user, and at least one chatbot interlocutor, the plurality of interlocutors not including the at least one second user, the selecting including,
searching a history of messages communicated between the first user and a third user, and selecting, as the at least one interlocutor, the third user as the human interlocutor based on the history of messages and the extracted interrogative pronoun and the extracted at least one keyword;
convert the at least some of the message to at least one recommended message related to the selected at least one interlocutor; and
transmit the at least one recommended message to the selected at least one interlocutor, wherein
the at least one chatbot interlocutor includes a plurality of chatbot interlocutors,
the memory is further configured to store keyword-suitability data related to the plurality of chatbot interlocutors,
the selecting the at least one interlocutor further comprises selecting at least one chatbot interlocutor from the plurality of chatbot interlocutors, the selected at least one chatbot interlocutor having a suitability value equal to or higher than a desired reference suitability value with respect to the at least one keyword based on the keyword-suitability data of the plurality of chatbot interlocutors, and
the converting the at least some of the message to the at least one recommended message further comprises converting the at least some of the message to at least one recommended message based on the selected at least one chatbot interlocutor by using a protocol stored in the memory associated with the plurality of chatbot interlocutors.

2. The message exchanging apparatus of claim 1, wherein the at least one controller is further configured to execute the computer readable instructions to:
transmit, to the user terminal, the at least one recommended message; and
receive, from the user terminal, selection information related to the at least one recommended message,
wherein the transmitting of the at least one recommended message comprises transmitting a recommended message associated with the selected at least one chatbot interlocutor based on the selection information.

3. The message exchange apparatus of claim 2, wherein the at least one controller is further configured to execute the computer readable instructions to update the keyword-suitability data associated with the plurality of chatbot interlocutors based on the selection information.

4. The message exchanging apparatus of claim 1, wherein the converting of the at least some of the message to the at least one recommended message comprises:
determining a cluster to which each of the at least one interlocutor belongs; and
converting the at least some of the message to at least one recommended message based on the determined clusters according to at least one attribute of the cluster.

5. The message exchanging apparatus of claim 4, wherein the cluster is determined based on at least one message transmitted to each of the at least one interlocutor by the first user or the at least one second user, or received from each of the at least one interlocutor by the first user or the at least one second user.

6. The message exchanging apparatus of claim 1, wherein the receiving in real-time at least some of the message to be transmitted further includes receiving the at least some of the message to be transmitted over a network while a first user inputs a message into the user terminal.

7. The message exchanging apparatus of claim 4, wherein the converting the at least some of the message to at least one recommended message is further based on a language type associated with the determined cluster.

8. A non-transitory computer readable recording medium having stored thereon computer readable instructions, which when executed, cause at least one processor to execute, a message exchanging method comprising:
receiving in real-time from a first user, at least some of a message to be transmitted to at least one second user, wherein the at least some of the message is any incomplete sentence generated while the first user inputs the message, the first user and the at least one second user being human users;
extracting an interrogative pronoun from the received at least some of the message;
extracting at least one keyword from the message to be transmitted;
selecting at least one interlocutor from a plurality of interlocutors based on the extracted interrogative pronoun and the extracted at least one keyword, the plurality of interlocutors including at least one human interlocutor different from the first user and the at least one second user, and at least one chatbot interlocutor, the plurality of interlocutors not including the at least one second user, the selecting including,
searching a history of messages communicated between the first user and a third user, and
selecting, as the at least one interlocutor, the third user as the human interlocutor based on the history of messages and the extracted interrogative pronoun and the extracted at least one keyword;
converting the at least some of the message to at least one recommended message related to the selected at least one interlocutor; and
transmitting the at least one recommended message to the selected at least one interlocutor, wherein
the at least one chatbot interlocutor includes a plurality of chatbot interlocutors, the method further comprises storing keyword-suitability data related to the plurality of chatbot interlocutors in a database, the selecting the at least one interlocutor further comprises selecting at least one chatbot interlocutor from the plurality of chatbot interlocutors, the selected at least one chatbot interlocutor having a suitability value equal to or higher than a desired reference suitability value with respect to the at least one keyword based on the keyword-suitability data of the plurality of chatbot interlocutors, and the converting the at least some of the message to the at least one recommended message further comprises converting the at least some of the message to at least one recommended message based on the selected at least one chatbot interlocutor by using a protocol stored in the database associated with the plurality of chatbot interlocutors.

9. The non-transitory computer readable medium of claim 8, the message exchanging method further comprising:
displaying the at least one recommended message; and
receiving, from the first user, selection information related to the at least one recommended message,
wherein the transmitting of the at least one recommended message comprises transmitting a recommended message associated with the selected at least one chatbot interlocutor based on the selection information.

10. The non-transitory computer readable medium of claim 9, the message exchanging method further comprising:
storing the selected at least one recommended message together with the at least one keyword,
wherein the displaying comprises displaying, on a screen, at least one recommended message in which a keyword and an interlocutor match the extracted at least on keyword and the selected at least one interlocutor, from among the stored recommended messages.

11. The non-transitory computer readable medium of claim 9, the message exchanging method further comprising:
transmitting the extracted at least one keyword and the selected at least one interlocutor to a server; and
receiving at least one server recommended message based on the extracted at least one keyword and the selected at least one interlocutor from the server,
wherein the displaying comprises displaying the server recommended message on a screen.

12. The non-transitory computer readable medium of claim 9, wherein the keyword-suitability data is updated based on the selection information.

13. The non-transitory computer readable medium of claim 8, wherein the converting of the at least some of the message to the at least one recommended message comprises:
determining a cluster to which each of the at least one interlocutor belongs; and
converting the at least some of the message to at least one recommended message based on the determined clusters according to at least one attribute of the cluster.

14. The non-transitory computer readable medium of claim 13, wherein the cluster is determined based on at least one message transmitted to each of the at least one interlocutor or received from each of the at least one interlocutor.

15. A message exchanging method comprising:
receiving, using at least one processor, in real-time from a first user, at least some of a message to be transmitted to at least one second user, wherein the at least some of the message is any incomplete sentence generated while the first user inputs the message, the first user and the at least one second user being human users;
extracting, using the at least one processor, an interrogative pronoun from the received at least some of the message;
extracting, using the at least one processor, at least one keyword from the message;
selecting, using the at least one processor, at least one interlocutor from a plurality of interlocutors based on the extracted interrogative pronoun and the extracted at least one keyword, the plurality of interlocutors including at least one human interlocutor different from the first user and the at least one second user, and at least one chatbot interlocutor, the plurality of interlocutors not including the at least one second user, the selecting including,
searching a history of messages communicated between the first user and a third user, and
selecting, as the at least one interlocutor, the third user as the human interlocutor based on the history of messages and the extracted interrogative pronoun and the extracted at least one keyword;
converting, using the at least one processor, the at least some of the message to at least one recommended message related to the selected at least one interlocutor;
transmitting, using the at least one processor, the at least one recommended message to the selected at least one interlocutor; and
storing, using the at least one processor, keyword-suitability data related to a plurality of chatbot interlocutors in a database, the plurality of chatbot interlocutors including the at least one chatbot interlocutor, wherein
the selecting the at least one interlocutor further comprises selecting at least one chatbot interlocutor from the plurality of chatbot interlocutors, the selected at least one chatbot interlocutor having a suitability value equal to or higher than a desired reference suitability value with respect to the at least one keyword based on the keyword-suitability data of the plurality of chatbot interlocutors, and
the converting the at least some of the message to the at least one recommended message further comprises converting the at least some of the message to at least one recommended message based on the selected at least one chatbot interlocutor by using a protocol stored in the memory associated with the plurality of chatbot interlocutors.

16. The message exchanging method of claim 15, further comprising:
displaying, using the at least one processor, the at least one recommended message; and
receiving, using the at least one processor, from the first user, selection information of at least one recommended message,
wherein the transmitting of the at least one recommended message comprises transmitting a recommended message associated with the selected at least one chatbot interlocutor based on the selection information.

* * * * *